Figure 1:
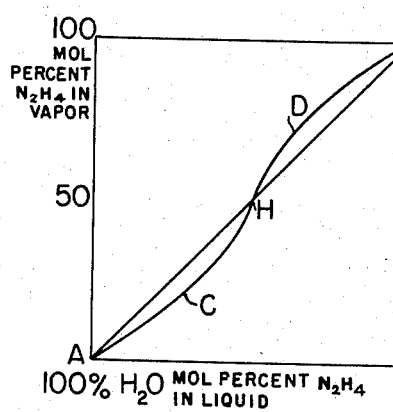

Oct. 28, 1958  B. H. NICOLAISEN ET AL  2,858,254
DISTILLATION OF UNSYMMETRICAL DIMETHYLHYDRAZINE
Filed Dec. 13, 1955

Bernard H. Nicolaisen
Charles J. Smith Jr.
INVENTORS.

BY
Adams, Forward and McLean
ATTORNEYS

# United States Patent Office 2,858,254
Patented Oct. 28, 1958

2,858,254

DISTILLATION OF UNSYMMETRICAL DIMETHYLHYDRAZINE

Bernard H. Nicolaisen, Kenmore, and Charles J. Smith, Jr., Grand Island, N. Y., assignors to Olin Mathieson Chemical Corporation, a corporation of Virginia Application December 13, 1955, Serial No. 552,809

4 Claims. (Cl. 202—51)

Our invention relates to improvements in the distillation of unsymmetrical dimethylhydrazine and more particularly to the recovery of unsymmetrical dimethylhydrazine from aqueous solutions by distillation.

Hydrazine and unsymmetrical dimethylhydrazine may both be prepared by modifications of the Raschig process. In the manufacture of hydrazine by the Raschig process, dilute aqueous chloroamine, $NH_2Cl$, formed by the reaction of aqueous ammonia and dilute sodium hypochlorite is treated with an excess of ammonia to form hydrazine. After removal of the excess ammonia, the hydrazine is first obtained as a dilute aqueous solution of about one to three percent by weight. A composition approximating hydrazine hydrate can be obtained by fractionation of the aqueous solution of hydrazine since water has a higher vapor pressure than hydrazine hydrate at the same temperatures. To obtain more concentrated solutions of hydrazine by simple distillation is not feasible since the constant boiling composition approximating hydrazine hydrate distills over without change in composition. Extractive distillation with caustic or aniline or other third components as well as chemical methods of dehydration have been used to obtain anhydrous hydrazine from hydrazine hydrate.

Unsymmetrical dimethylhydrazine may be similarly prepared by the reaction of dilute chloroamine solutions, derived from ammonia and dilute sodium hypochlorite, by reaction with dimethylamine. Dimethylhydrazine may also be obtained by other means but the cheapness of the reagents in the Raschig process makes this method economically attractive. The dimethylhydrazine, like hydrazine, is first obtained as a dilute aqueous solution containing about one to three, usually 2.5, percent by weight of dimethylhydrazine. These dilute dimethylhydrazine solutions behave very differently on distillation at atmospheric pressure from dilute aqueous hydrazine. In the hydrazine-water system, water is more volatile than hydrazine hydrate and may be removed overhead to obtain the hydrate as bottoms. In the dimethylhydrazine-water system, no such hydrate is formed and dimethylhydrazine is more volatile than water. Removal of the dimethylhydrazine overhead leaving water as bottoms is therefore theoretically possible. However, because of the peculiar shape of the vapor equilibrium curve in the dimethylhydrazine-water system, this is practically not feasible. The vapors in equilibrium with the liquor at atmospheric pressure are only slightly richer in dimethylhydrazine at low concentrations of the latter and an uneconomically large number of plates is necessary.

The contrasting behavior of hydrazine and dimethylhydrazine with respect to the distillation of aqueous solution thereof is further shown in the accompanying drawings. Figure 1 shows approximately the vapor-liquid equilibrium of aqueous solutions of hydrazine and explains the behavior of aqueous solutions of hydrazine on distillation. Solutions containing more water than correspond to hydrazine monohydrate in equilibrium with the vapors thereof at their boiling points are shown by the portion of the curve ACH. Thus these solutions are in equilibrium with vapors richer in water than the liquid and the differences in composition are sufficient to permit the separation of pure water vapor overhead in a fractionating column having a practical number of plates. As the composition of hydrazine monohydrate is approached, the composition of the vapors approaches that of the liquid and at the azeotropic composition these are identical. The curve HDB of Figure 1 shows that aqueous solutions of hydrazine richer in hydrazine than hydrazine monohydrate have in equilibrium therewith vapors richer in hydrazine than the monohydrate and these vapors may be removed overhead as anhydrous hydrazine using a column having a practical number of plates.

The peculiarly contrasting behavior of aqueous solutions of dimethylhydrazine on distillation at atmospheric pressure are explained by reference to curve A'C'B' of Figure 2. No constant boiling azeotropes are found in this system at atmospheric pressure and all solutions of any proportion of these two components are in equilibrium with their vapors richer in dimethylhydrazine than the liquid. Hence the dimethylhydrazine may theoretically be distilled overhead. In the regions of high dimethylhydrazine concentration shown in the curves of Figure 2, the exact relative positions of the curves are not entirely certain but the process of the present invention relates more particularly to the relative positions in the regions of lower concentrations of dimethylhydrazine. The very flat portion of curve A'C'B' approaching tangency to A'B' in the region of low concentrations of dimethylhydrazine means that the vapors are only very slightly richer in dimethylhydrazine than the liquid with which they are in equilibrium. For this reason an extremely large number of plates is necessary in order to separate anhydrous dimethylhydrazine starting from the very dilute aqueous solutions obtained in the synthesis of dimethylhydrazine.

We have now discovered that under pressures greater than atmospheric, an extremely advantageous change in the phase relationships occurs and the proportion of dimethylhydrazine in the vapor in equilibrium with the liquid phase at most temperatures is very much richer in dimethylhydrazine than at atmospheric pressure. For this reason the distillation of dilute aqueous solutions of dimethylhydrazine under pressure provides a distinct advantage in reduction of the number of plates required for separation of dimethylhydrazine from water.

Figure 2:
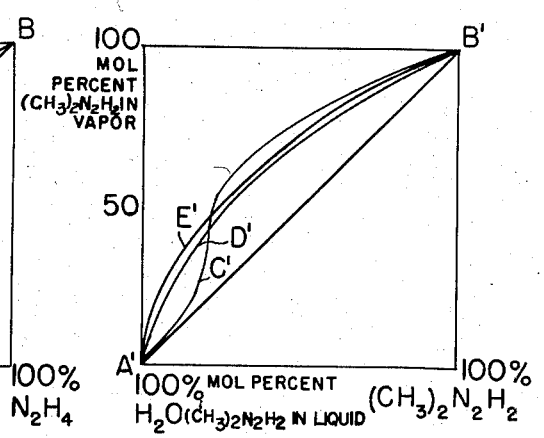

Figure 2 curve A'D'B' relates the composition of vapors in equilibrium with liquid solutions of dimethylhydrazine and water under superatmospheric pressures of about 15 to 25 p. s. i. g. The shape of this curve shows the great advantage of distillation of these solutions under superatmospheric pressures as contrasted with distillation under atmospheric pressure. Thus the vapors in equilibrium with liquid at any temperature are very much richer in dimethylhydrazine than at atmospheric pressure and the number of plates in a tower necessary to produce anhydrous dimethylhydrazine is very much less at 15 to 25 p. s. i. g. than at atmospheric pressure. Higher pressures are also useful.

The process of our invention thus comprises the concentration of dimethylhydrazine with respect to water by fractionating such solutions under pressures of at least about 15 p. s. i. g. At pressures lower than about 15 p. s. i. g., the vapor composition curve approaches that at atmospheric pressure and there is little advantage below a pressure of about 15 p. s. i. g. At high pressures reversion occurs and less dimethylhydrazine in proportion to water appears in the vapor phase. The curve A'D'B' must approach the line A'B' since, when the critical temperature is reached, no separate liquid and vapor phases are present and the curve A'D'B' becomes identical with line A'B'. Dimethylhydrazine is much more stable thermally than hydrazine and no serious decomposition occurs below about 200° C. At such temperatures and pressures, however, equipment cost increase materially and it is preferred to operate the process at lower pressures and temperatures where simple equipment is adequate. The range of 15 to 150 p. s. i. g. is preferred according to the present invention.

The curves in Figure 2 further show that there is little advantage in the pressure distillation compared to atmospheric distillation when the composition of the liquid is rich in dimethylhydrazine to the extent of more than 30 mol percent. The entire fractionation can, however, be carried out under pressure to obtain dimethylhydrazine having a concentration of 95 percent by weight or higher. Starting with a synthesis liquor containing about 1 to 3 percent by weight of dimethylhydrazine, this requires a column having approximately 40 theoretical plates.

Advantageously the pressure distillation of the present invention is used only in that part of the concentration where it is of particular advantage. Thus a column operating at about 20 p. s. i. g. and having the equivalent of about 9 theroretical plates suffices for concentration to about 10 percent by weight dimethylhydrazine. The 10 percent product can be finished in any of several ways, for example, by fractionation at atmospheric pressure, providing the equivalent of 10 additional theoretical plates which suffice to produce 95 percent by weight dimethylhydrazine.

Other methods may be used for finishing the concentration to 95 percent or better dimethylhydrazine. In a particularly advantageous combination, a 10 percent by weight dimethylhydrazine product can be produced from the 1 to 3 percent by weight liquor by pressure distillation using a pressure of about 20 p. s. i. g. and the equivalent of about 9 theoretical plates. The product is further fractionated using aqueous caustic soda as an extractive agent. Extractive distillation of aqueous dimethylhydrazine solution containing caustic soda is described in pending application Serial No. 552,812, filed December 13, 1955, of Bernard H. Nicolaisen. Advantageously the distillation is carried out in a column having the equivalent of about six theoretical plates to produce dimethylhydrazine overhead having a concentration of 95 percent to 99 percent by weight. This effects a material and advantageous saving in the number of theoretical plates required for the concentration from 10 percent to 95 percent compared with atmospheric fractionation without caustic. The number of required plates may be reduced to one-half as many or less. In using caustic as an extractive agent, a concentrated solution of 20 to 50 percent by weight or more can be charged to the still in sufficient quantities to result in a concentration of from as little as about 1 percent to 30 percent by weight when combined with the charge of 10 percent dimethylhydrazine. More concentrated caustic than 50 percent has a higher set point and may lead to pumping difficulties. More dilute caustic unnecessarily increases the load on the column in order to produce an anhydrous dimethylhydrazine product.

It is a further advantage of the present invention that raw synthesis liquor from the modified Raschig synthesis of dimethylhydrazine can be processed without any preliminary treatment to remove by-product sodium chloride. In the manufacture of unsubstituted hydrazine, the raw liquor is usually charged to an evaporator to remove sodium chloride as a solid and dilute hydrazine and water as vapors. When hydrazine hydrate is later recovered as bottoms, it is not contaminated by salt. In contrast, since dimethylhydrazine is taken overhead, preliminary separation of salt is unnecessary. The salt is removed as a brine from the bottom of the pressure tower. Besides eliminating a separate salt-separating step from the recovery system, the process of the present invention is unexpectedly improved thereby. The presence of the salt in the liquor being distilled under pressure serves further to enrich the equilibrium vapors in dimethylhydrazine as shown approximately by curve A'E'B' of Figure 2 and reduces the number of theoretical plates required. The addition of further amounts of salt or of caustic to the raw synthesis liquor still further reduces the number of required plates.

Figure 3:
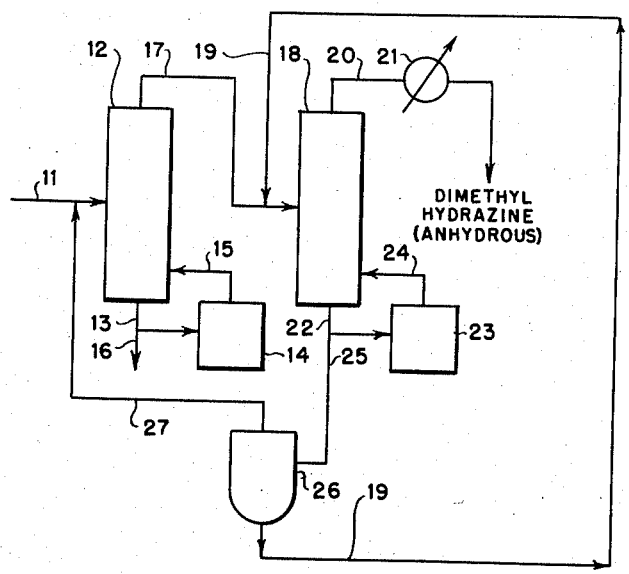

In the continuous operation of one embodiment of the present invention, as shown in Figure 3 dilute unsymmetrical dimethylhydrazine liquors are charged via line 11 to still 12 to maintain a pressure of 30 p. s. i. g. Water free from dimethylhydrazine is removed as bottoms via line 13 through reboiler 14 which returns steam to the still via line 15. Alternatively the pressure column may be heated by the introduction of open steam into the bottom. The reboiler 14 may thus be eliminated. Water, containing any salt in the charge, is discarded via line 16. Dimethylhydrazine having a concentration of about 10 percent by weight is taken overhead via line 17 to fractionating column 18 operating at atmospheric pressure. Aqueous caustic soda having a concentration of about 30 percent by weight is charged to column 18 via line 19 and dimethylhydrazine at concentrations of 95 percent or better is taken overhead via line 20 through condenser 21 and constitutes the liquid anhydrous dimethylhydrazine product. Dilute caustic is removed from the bottom of column 18 via line 22 through reboiler 23 which returns vapors to column 18 via line 24. The dilute caustic is transferred via line 25 to evaporator 26. Dimethylhydrazine in the extracting liquor is removed overhead and condensed to a solution having a concentration of about 1 per cent and returned via line 27 and line 11 to the system. The 30 percent caustic evaporator bottoms are returned via line 19 for re-use in the extractive distillation.

*Example*

A synthesis stream obtained by the modified Raschig synthesis described in co-pending application, Serial No. 416,948, filed March 17, 1954, contained 8 parts by weight of dimethylhydrazine, 280 parts by weight of water and 22.5 parts by weight of sodium chloride. It was introduced at the rate of 310 parts by weight per hour to approximately the mid-point of a fractionating column having the equivalent of about nine theoretical plates. A recycle stream comprising 1.4 percent dimethylhydrazine by weight recovered from the caustic evaporator to be described was introduced at the same point at the rate of about 62 parts by weight per hour. The column was heated by a reboiler and operated at 15 p. s. i. g. Top and bottom temperatures were 120° C. and 122° C. respectively. The overhead stream was composed of 6.75 parts of dimethylhydrazine and 61.35 parts of water by weight. All of the sodium chloride and most of the water charged to the column were removed in the bottom stream and discarded.

The overhead stream containing 9.9 percent by weight of dimethylhydrazine was charged to an atmospheric extractive distillation column having the equivalent of about six theoretical plates together with 92 parts by weight per hour of a 30 percent by weight aqueous caustic. The overhead stream having a temperature of 61° C. was condensed to the 97 percent by weight dimethylhydrazine product. The bottoms from the atmospheric column were charged to a caustic evaporator to recover 92 parts by weight per hour of 30 percent by weight caustic which was recycled to the extractive column. The overhead from the caustic evaporator composed of 0.85 parts by weight per hour of dimethylhydrazine and 61.2 parts by weight per hour of water was recycled to the feed to the pressure column. The entire system was padded with nitrogen.

In a preferred embodiment of the invention, the process is operated substantially as described in Figure 3 and the above example with the exception that the atmospheric extractive distillation column 18 is operated with such efficiency that the caustic bottoms contain no residual dimethylhydrazine. The necessity for caustic evaporator 26 and lines 19 and 27 is eliminated. The column bottoms are transferred to the caustic chlorination step for the manufacture of sodium hypochlorite for use in the synthesis reaction.

We claim:

1. In the separation of unsymmetrical dimethylhydrazine from aqueous solution, the step of fractionally distilling an aqueous solution of unsymmetrical dimethylhydrazine containing not more than about 20 mole percent of the unsymmetrical dimethylhydrazine at a superatmospheric pressure of at least about 15 p. s. i. g.

2. The method of claim 1 in which the pressure is about 15 to 150 p. s. i. g.

3. The method of claim 1 in which the aqueous solution of unsymmetrical dimethylhydrazine which is introduced to the fractional distillation step contains about 1 to 3 percent by weight of unsymmetrical dimethylhydrazine and by-product sodium chloride formed in preparing the unsymmetrical dimethylhydrazine by reacting monochloroamine and dimethylamine in dilute aqueous caustic.

4. The method of claim 3 in which the pressure is about 15 to 150 p. s. i. g.

References Cited in the file of this patent
UNITED STATES PATENTS

| | | |
|---|---|---|
| 2,678,298 | Nicolaisen | May 11, 1954 |
| 2,733,195 | Miller | Jan. 31, 1956 |